Aug. 29, 1933.    L. HAMMOND    1,924,606
ELECTROLYTIC CONDENSER
Filed Nov. 8, 1928    2 Sheets-Sheet 1

Inventor
Laurens Hammond
by Parker & Carter
Attorneys.

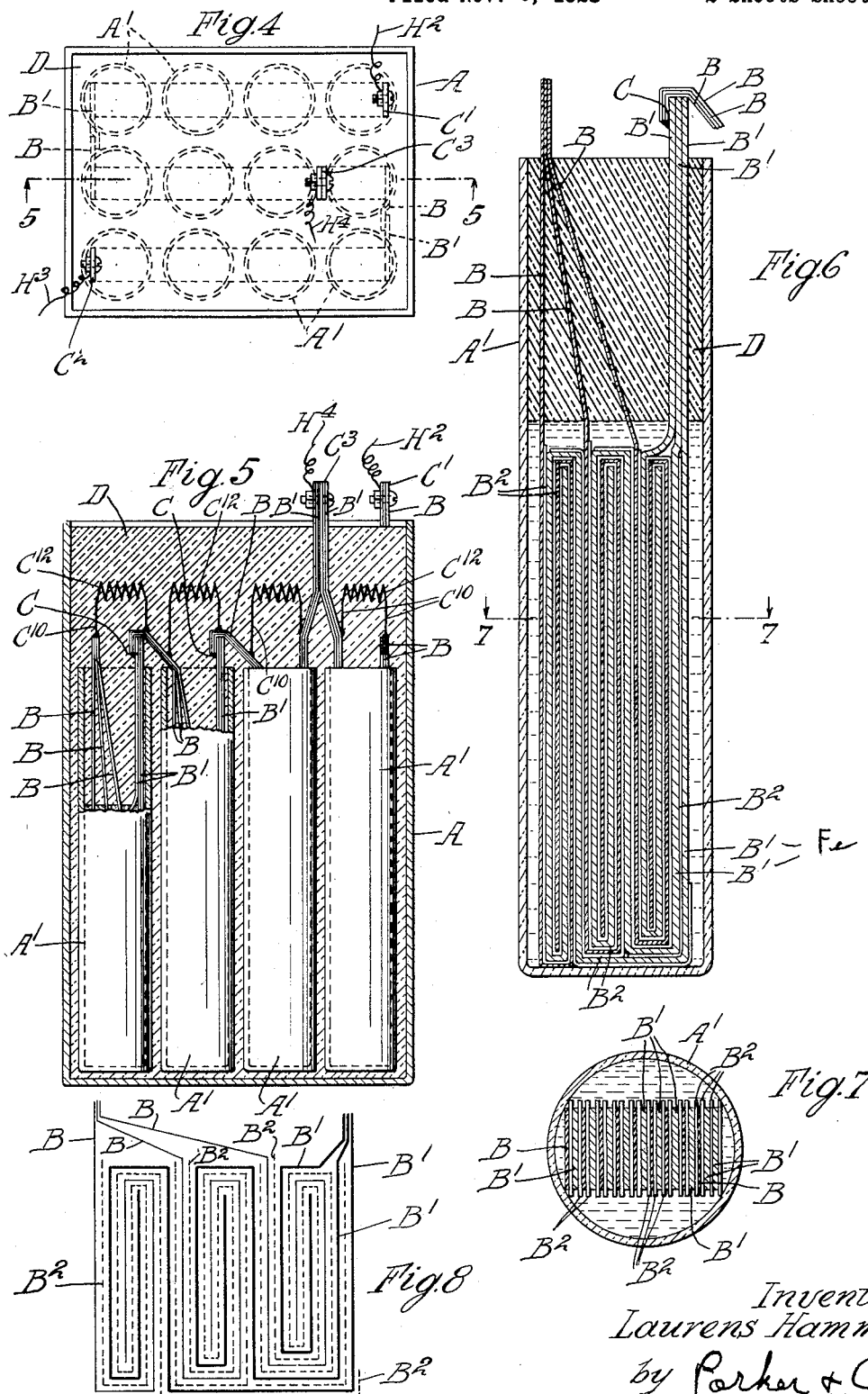

Patented Aug. 29, 1933

1,924,606

UNITED STATES PATENT OFFICE 1,924,606

ELECTROLYTIC CONDENSER

Laurens Hammond, Evanston, Ill., assignor, by mesne assignments, to Ralph D. Mershon, New York, N. Y.

Application November 8, 1928. Serial No. 318,085

12 Claims. (Cl. 175—363)

My invention relates to an improvement in electrolytic condensers and to a filtering circuit in which such condensers may be employed. The condensers I employ are of the general type of the condenser invented by Edward F. Andrews and described and claimed in his co-pending application 101,347, filed on April 12, 1926. Each condenser consists essentially of a pair of metallic electrodes immersed in an electrolyte, the condensers being adapted to function at low voltages, the limit of the voltage at which they will operate being fixed by the voltage at which the water of the electrolyte is continuously dissociated into free hydrogen and oxygen gas.

The electrolytic condensers of the type described may be employed as a condenser in filter circuits carrying alternating or pulsating currents. In a filter circuit of the type shown in the above co-pending application or in Figure 1 of the present application, the impedance of such a cell or condenser to alternating current is exceedingly small by comparison to its impedance to the passage of a direct current. For use in such a circuit the best functioning cell is one having a minimum impedance to the passage of alternating current. For example, the alternating current which will flow through the circuit including the inductance or choke coil will be inversely proportional to the relative impedance of the circuit including the inductance and the impedance of the condensers or cells G of Figure 1.

Electrolytic condensers or cells of the above type in general function best when they are operated at or near the gassing voltage. By that I mean that the cells, during operation, are continually liberating small amounts of free oxygen and hydrogen gas, which rises in the form of bubbles and escapes from the cell. I have developed an improvement upon the cell of the general type of the above Andrews application, which functions at voltages at which no free gasses of any kind are liberated. The commercial and practical advantage of such cells lies in the fact that the condenser may be sealed, after construction, and will operate continuously thereafter as long as it is not subjected to a voltage rise sufficient to liberate free oxygen and hydrogen gas from the electrolyte. The efficiency of such a condenser depends upon the particular metals employed for its electrodes.

The circuit and cells herein described and shown have many applications and uses. They are particularly useful for delivering smooth direct current, from a source of alternating current, for the operation of the filaments of thermionic tubes in radio sets, or for other purposes where substantially smooth direct current is desired.

I illustrate my invention more or less diagrammatically in the accompanying drawings, wherein—

Figure 4 is a plan view of one of my cells;

Figure 5 is a section along the line 5—5 of Figure 4;

Figure 6 is a vertical section on an enlarged scale through one of the cell units;

Figure 7 is a section on the line 7—7 of Figure 6; and

Figure 8 is a diagrammatic illustration of the relation of the electrodes of the cell shown in Figure 6.

Like parts are indicated by like symbols throughout the specification and drawings.

Referring first to the structure of the condenser, I employ any suitable outer housing or casing A which may for example be of metal. Positioned within it are a plurality of containers $A^1$ which may for example be glass tubes having one open end.

In each such tube are located positive and negative electrodes herein shown as consisting each of three strips or ribbons of the desired material. Referring to Figure 6, B, B, indicate the strips of the positive electrode preferably of nickel, and $B^1$ $B^1$ $B^1$ indicate the strips of the negative electrode, which may be of iron. Interposed between the strips are strips or ribbons $B^2$ $B^2$ of filter paper. In the formation of the cell the strips or ribbons of metal and filter paper are rolled or coiled together, as diagrammatically shown in Figure 8, to form a pack, the cross-section of which is shown in Figure 7. This pack is positioned in the tube $A^1$, into which is poured a suitable electrolyte, which may for example be an aqueous solution of potassium hydroxide. The ends of the electrode strips or ribbons B $B^1$ are secured together at the upper end of the tube $A^1$ and each group of strips constitutes a single effective electrode. By employing such a composite electrode, with a plurality of strips in parallel, I am able to obtain the advantage of the exposal of a very large surface to the electrolyte, without the resistance loss which would be inevitable if a single thin strip of triple length were employed.

Figure 1:
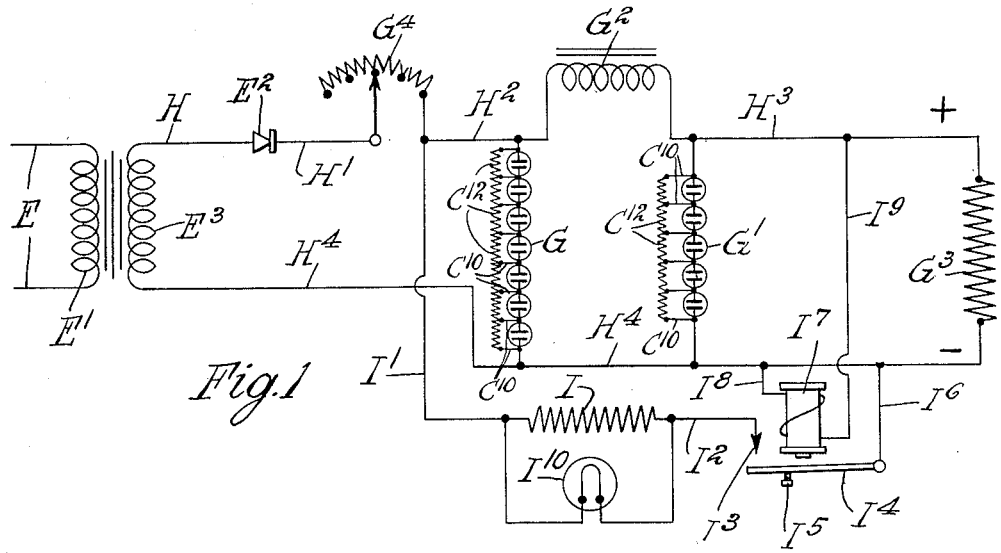
Figure 1 is a wiring diagram of a circuit in which my cells are employed.

In the formation of the complete condenser, as associated with the filter circuit of Figure 1, I find it preferable to employ 12 cells, arranged in two series, one of 7 and the other of 5 cells. I place the 12 cells in the single container A and make the connection from cell to cell, as shown in Figure 5, the negative electrode or electrode strips of one cell being soldered or otherwise secured to the positive electrode strips of the adjacent cell, as at C, C. $C^1$ indicates the terminal of the end cell of one series, and $C^2$ the opposite terminal of the opposite end cell of the opposite series and $C^3$ the common intermediate terminal of the two series. In order to control the voltage of the individual cells I shunt each individual condenser cell, with a high resistance. In Figures 1 and 5 I illustrate the leads $C^{10}$ extending from the electrodes and the resistances $C^{12}$ in circuit therewith.

In the actual assembly of the condenser, after the electrode packs have been inserted in the individual cells and the connections made, by soldering or otherwise, and the electrolyte has been poured into each cell the entire assembly is raised to a temperature approximating the boiling point, and a sealing compound D, for example of tar, is poured into the interior of the casing A in such fashion as to fill the entire space above, between and beneath the containers $A^1$. The tar, being lighter than the electrolyte, will fill the upper portion of the individual tubes $A^1$. The terminals $C^1$ $C^2$ and $C^3$ are brought up through the top of the tar, but the individual cells and the remaining connections are permanently and completely concealed within the housing. The result is what is in effect a dry cell, so far as convenience of handling is concerned and impossibility of losing or spilling the electrolyte.

Referring to the use of the condenser, as shown for example in Figure 1, E indicates a source of alternating current and $E^1$ the primary coil of a transformer adapted to provide the desired voltage. $E^2$ diagrammatically indicates a rectifier adapted to allow the passage of current through it in but one direction, thereby causing a pulsating current to flow in the secondary coil $E^3$ of the transformer.

G and $G^1$ diagrammatically indicate the two series of cells shown in greater detail in Figures 4, 5, 6 and 7 above described, and $G^2$ indicates a choke coil having a high reactance by comparison to its resistance, connected in series with the load which is diagrammatically illustrated as the resistance $G^3$. Referring to the wiring, H is a conductor extending from one end of the secondary coil $E^3$ to the rectifier $E^2$. $H^1$ extends from the rectifier to the rheostat $G^4$. $H^2$ leads from such rheostat to the choke coil $G^2$ and $H^3$ extends from the choke coil to the load. $H^4$ indicates a conductive connection between the opposite end of the secondary coil $E^3$ and the load $G^3$. It will be realized that the wiring may be interrupted or pieced out at various points, such as where contact is made with the cell series G and $G^1$, but the wiring diagram of Figure 1, as above described, will indicate the circuit connections.

The operation of the filter circuit of Figure 1 is essentially the same as that described and shown in the co-pending Andrews application 101,347. The employment of an uneven number of cells across the input and output on opposite sides of the choke coil does not of itself form part of the present invention and is described and claimed in the co-pending Edward F. Andrews application No. 128,959, filed on August 13, 1926.

In the employment of sealed or non-gassing cells I find it necessary to provide means for positively limiting the operating voltage to voltages insufficient to cause gassing in the individual cells, since otherwise the generation of gas within the sealed cells might destroy the apparatus. I therefore employ a supplemental resistance I which is connected by the conductive line $I^1$ with the line $H^2$ and thus with the rheostat $G^4$. From the opposite side of the resistance I extends the line $I^2$ with the terminal or contact $I^3$. $I^4$ is a pivoted conductive leaf, for example of iron, normally resting upon any suitable support $I^5$, herein shown as screw threaded for vertical adjustment. $I^6$ is a conductor extending from the leaf $I^4$ to the line $H^4$. $I^7$ is an electro-magnet connected across the load by means of the conductors $I^8$ $I^9$. $I^{10}$ is a signal light in parallel with the resistance I and adapted to be actuated when the leaf or switch $I^4$ is closed.

It will be understood that when an excess voltage is supplied and when the voltage across the load approaches the danger point, the electro-magnet $I^7$ is actuated and raises the leaf $I^4$ against gravity and into circuit closing contact with the opposed switch element $I^3$. The resistance I is thus cut in across the load and serves to reduce the voltage, or to prevent its rise to the danger point. The signal light $I^{10}$ is of use for example when my condenser is applied to a radio set, the light in such case being preferably visible through the panel. When the user sees that the light is lighted he knows that the circuit through the resistance I has been closed and that therefore there is an excess voltage. This excess voltage he can reduce by manipulation of the rheostat $G^4$ to such a point that the electro-magnet $I^7$ is no longer actuated; the circuit through the resistance I is then broken, and the light $I^{10}$ goes out.

I have found that the efficiency of my condenser, depending on what metals are used for its electrodes, may fall off to a very marked extent when the cell is operated at a voltage of from $\frac{8}{10}$ to $1\frac{2}{10}$ volts per cell, as compared to its operation at a gassing voltage. The reason for this behavior is not entirely clear, but the principles involved may well be illustrated by reference to an experiment which shall now be described.

Figure 3:
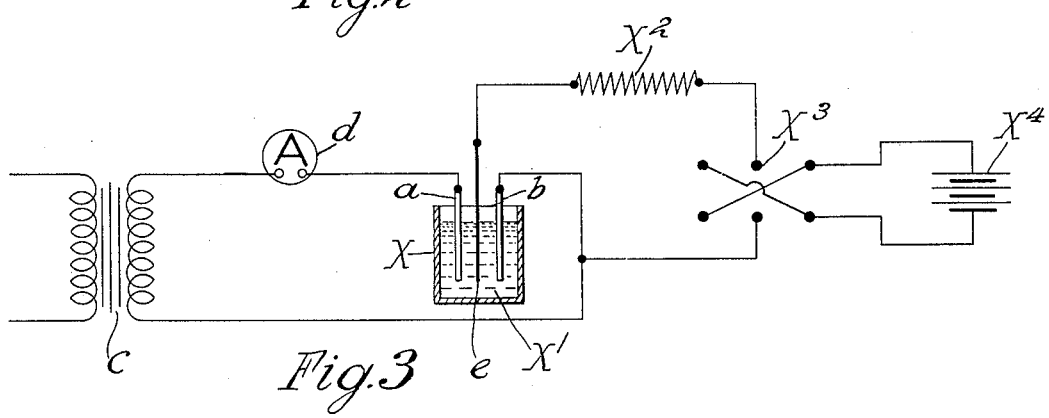
Figure 3 is a wiring diagram of another testing circuit.

Referring to Figure 3 the secondary coil $c$ is connected through an alternating current ammeter $d$ to two metallic electrodes $a$, $b$, which may, for example, be of pure nickel inserted in an electrolytic cell X which may contain an aqueous solution of potassium hydroxide $X^1$.

The cell X is also provided with a very small third electrode $e$, which may for example be a piece of nickel wire which is connected through the high resistance $X^2$ and the double pole throw switch $X^3$ with the storage battery $X^4$.

Assume that the switch is thrown so that the voltage of the battery is impressed on the third electrode $e$, making it positive in relation to the two electrodes $a$, $b$, which are of substantially the same average potential. In this case current will flow from $e$ to $a$ and $b$, liberating a small amount of oxygen gas at the third electrode $e$ and hydrogen gas at the electrodes, $a$, $b$, the value of the current flow being limited to a few milliamperes by the high resistance $X^2$. The transformer is now energized from any suitable alternating source, and it will be found that only a very small current will flow in the circuit $a, b, c, d$, as indicated by the low current reading at the alternating current ammeter $d$. It will be, let us say, less than ½ ampere. Thus, under the circumstances described, the electrolytic cell has a high impedance value to the passage of alternating current.

If now the double pole double throw switch $X^3$ is thrown to the opposite position, to cause a current to flow in the opposite direction in the circuit which includes the third electrode $e$ and the high resistance $X^2$, after a short time hydrogen will be liberated at the third electrode $e$ and a small amount of oxygen will be liberated by the electrodes $a, b$. Even though the current flowing in this manner is a very small amount, say a few milliamperes, the result will be that a large current, of two to three amperes will flow through the circuit $a, b, c, d$, as observed on the ammeter $d$. These readings necessarily indicate that the impedance to alternating current has decreased to a very great extent, and under these circumstances it may be said that the electrolytic cell, which previously was a poor condenser, has now become a good condenser.

From the above experiment it may be shown that nickel is a good electrode in such a condenser when it is surrounded by or saturated with or to some extent associated with oxygen gas, whereas it is a poor electrode when associated with hydrogen gas.

The reason for this behavior is not altogether clear, and is particularly difficult of explanation in the case where iron electrodes are substituted for nickel. In this case the behavior of the electrolytic cell is exactly opposite to its behavior with nickel electrodes, in that a large current will flow in the circuit $a, b, c, d$, when hydrogen gas is being liberated at the electrodes $a$ and $b$, and only a small current will flow when oxygen gas is being liberated at these electrodes. Thus the properties of iron and nickel are in this respect opposite, nickel being a good electrode when associated with oxygen gas and iron being a good electrode when associated with hydrogen gas.

The third metal of the iron group, cobalt, behaves unlike either iron or nickel, showing no strong tendency to behave differently, regardless of whether oxygen or hydrogen is liberated by the electrodes.

From these experiments it would appear that every metal has certain difinite characteristic properties which, so far as I am aware, have not heretofore been investigated. I am unable to find any allusion to these characteristics in standard works on electro-chemistry or in the classical theories dealing with this subject.

I have also investigated the characteristics of many other metals not included in the iron group and find them to behave in various ways which I am frequently unable to predict except by trial. Very few metals are permanent under such conditions of use, as they tend for the most part to go into solution. Metals of the iron group under some circumstances appear to remain totally unaffected by the electrolytic action involved.

The impedance of an electrolytic cell to alternating current depends on the impedance to the passage of a current from one electrode to the electrolyte and the impedance to the passage of a current from the electrolyte to the surface of the other electrode. Unless a cell is used in which the impedance to the passage of an alternating current is low at both electrodes, the impedance of the total cell will be high. It therefore follows that if a cell having both electrodes of nickel or both of iron is used as a condenser, it will of necessity have a high impedance when operated with a voltage drop across its electrodes of between $\frac{8}{10}$ and $1\frac{2}{10}$ volts. But if nickel is used as the positive electrode and iron as the negative, the impedance will be low and the cell will function well as a condenser. If the polarity of the cell is reversed, nickel becoming the negative and iron the positive, the impedance of the cell will rise to values which are many times greater.

Figure 2:
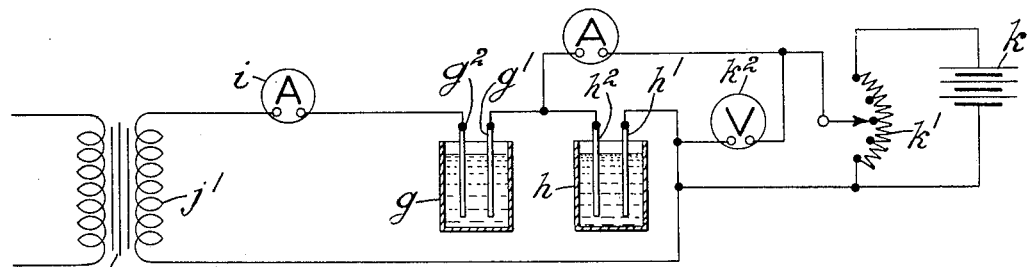
Figure 2 is a wiring diagram of a testing circuit below described.

These characteristics may be illustrated by another experiment shown diagrammatically in Figure 2, which is performed as follows. Two electrolytic cells $g, h$, are connected in series together with an alternating current ammeter $i$ and the secondary coil $j^1$ of the transformer $j$. By means of an auxiliary source of direct current, such as the storage battery $k$ acting through the potentiometer $k^1$, a direct current voltage may be impressed across the electrodes of the electrolytic cells, taking the electrodes $g^1, h^2$ as positive relative to the electrodes $g^2$ and $h^1$. If the electrodes $g^2$ and $h^1$ are of iron and the electrodes $g^1$ and $h^2$ are of nickel, the combined impedance of the two cells in series will be low, the large current flowing through the ammeter giving a high reading. If, on the contrary, the electrodes $g^1$ and $h^2$ are of iron and the electrodes $g^2$ and $h^1$ are of nickel, a very small reading will be obtained on the ammeter. By varying the position of the potentiometer $k_1$, the direct current voltage across the electrodes of the cells may be varied at will.

If voltage of less than 1¼ volts, for example, is observed on the volt meter $k^2$, only a very small amount of current will flow in the circuit, the current being a fraction of a miliampere, and no free hydrogen or oxygen gas will be evolved from the electrolytic cells $g$ and $h$. As the potentiometer is adjusted and the voltage falls, the current indicated by the ammeter will fall to a surprising extent. The impedance of the cells $g$ and $h$ falls very rapidly as the direct current voltage across them is reduced. In the case where nickel is the positive and iron the negative, a very satisfactory amount of current can be made to flow through them when the direct current voltage across them is between $\frac{8}{10}$ and $1\frac{2}{10}$ volts.

In combinations where nickel is used as the positive electrode and iron as the negative, or where a nickel positive and a cobalt negative are used, or where certain other metals are associated as negatives with a nickel positive, no deterioration of the electrodes is apparent, even upon continued operation for a long period of time.

I make use of these phenomena in the commercial application heretofore described. I employ nickel as a positive electrode and I prefer to employ iron as the negative electrode, although I do not wish to be limited to the use of iron.

I wish it to be understood that where I employ in the claims the terms "means for limiting the operating voltage to voltages at which substantially no free oxygen and hydrogen is liberated" I wish it understood that I refer to means outside of the condensers themselves such as over-voltage, cut-outs, ballast tubes, fuses and the like, or merely to the design of circuits in which the constants are so proportioned that the voltages cannot rise above a certain predetermined value.

The value referred to is that at which either hydrogen or oxygen or both are evolved in use in such a way as not to recombine but to be emitted from the cell. In the operation of these condensers it is possible for small amounts of oxygen and hydrogen gas to be generated within the cells and to be alloyed with or absorbed by or in some way associated with the electrodes and which gasses during operation recombine to form water. The theory of this is described in the co-pending Andrews application 101,347, earlier referred to. Where I refer to free oxygen and hydrogen gas being liberated I mean that the gas is in such form as would cause rising bubbles in the electrolyte or would build up a pressure on the inside of a sealed container.

I have found that when a number of condenser cells are connected in series and are operated below the gassing voltage that only an extremely minute amount of direct current passes through the cells. If all the cells are not exactly alike, and in any commercial structure they never are alike, I have found that there is a tendency for different cells to operate at different average voltages, the sum of such voltages being always of course the voltage across the group connected in series. Unless special provision is made this effect may produce very undesirable results affecting the efficiency of the apparatus to a large extent. To obviate this difficulty I shunt each individual condenser cell with a high resistance which is equal or substantially equal for each cell. When a group of these cells is employed in a filter circuit such as that shown in Figure 1 it is obvious that there will be a small loss of direct current through these resistances but this is an inappreciable amount if the value of the resistance is high enough.

On the other hand the voltage drop across each resistance will be substantially equal and will serve to maintain the same average potential across each condenser cell of the series. The resistances are indicated in Figures 1 and 5 as $C^{12}$.

Attempts have been made to make use of a variety of different electrolytic cells adapted to function as condensers in filter circuits and to operate them in such a way as to generate within the cells as little free gas as possible. If for instance a storage battery is used in a filter circuit in place of my condensers it is possible to so regulate the input and the output currents as to generate within the battery during normal operation only a very slight amount of gas through the hydrolysis of water. In completing a commercial structure it will be found necessary to leave some egress for gasses, if they are generated at all and at no matter how slow a rate, for it is obvious that if an electrolytic cell is hermetically sealed but continually generates within itself even the slightest trace of free gas the pressure will rise until the bursting point finally comes. A storage battery of the lead acid type or an electrolytic cell consisting of lead plates in sulphuric acid for instance when used in such a circuit will sulphate to a certain extent. By this is meant that some of the lead of the plates will combine with the sulphate radical in the sulphuric acid, thus liberating hydrogen. A cell of this type cannot therefore be hermetically sealed in commercial practice.

Similarly an electrolytic condenser of the film forming type, such as one having an aluminum positive electrode in a borate, tartrate, or similar electrolyte, requires the passage of a very small amount of direct current in order to maintain the dielectric film on the surface of the aluminum electrode.

While such condensers are made for commercial purposes in vessels which are substantially closed some egress is always provided to take care of the slight amount of the gas generated by electrolysis in the cell.

Wherever the smallest egress is allowed difficulties are experienced in shipment or sales resistance is shown by the public to the use of devices containing liquids which might be injurious to fabrics or household furnishing if spilled.

I have found that by making use of the type of condenser disclosed in the co-pending Andrews application No. 101,347, in which there is substantially no oxide or hydroxide associated with the positive electrode of the condenser, it is entirely practical to manufacture a hermetically sealed electrolytic condenser which will give continuous satisfaction if operated in connection with a circuit which will positively prevent a rise in voltage across the condenser which could free any gasses by electrolysis.

I claim:

1. In combination, an electrolytic condenser which includes electrodes and an electrolyte, a metallic positive electrode which does not combine chemically with the electrolyte, said electrode being free from any dielectric film, and means for limiting the operating voltage to voltages at which substantially no free oxygen or hydrogen is liberated.

2. In combination, an electrolytic condenser which includes electrodes and an electrolyte, a metallic positive electrode having substantially no oxide or hydroxide associated therewith, and means for limiting the operating voltage to voltages at which substantially no free oxygen or hydrogen is liberated.

3. In combination, an electrolytic condenser which includes electrodes and an electrolyte, a metallic positive electrode having substantially no oxide or hydroxide associated therewith, a gas-tight container for said condenser, and means for limiting the operating voltage to voltages at which substantially no free oxygen or hydrogen is liberated.

4. The combination with an electrolytic condenser, having a positive and a negative electrode, the positive electrode being of a metal of the iron group, and an electrolyte, of means for limiting the operating voltage to voltages at which substantially no free oxygen or hydrogen is liberated.

5. The combination with an electrolytic condenser, having a positive and a negative electrode, the positive electrode being of nickel, and an electrolyte, of means for limiting the operating voltage to voltages at which substantially no free oxygen or hydrogen is liberated.

6. The combination with an electrolytic condenser, having a positive and a negative electrode, the positive electrode including nickel in effective proportion, and an electrolyte, of means for limiting the operating voltage to voltages at which substantially no free oxygen or hydrogen is liberated.

7. The combination with an electrolytic condenser, having a positive and a negative electrode, the positive electrode being of and a metal of the iron group, an electrolyte, and a substantially gas-tight container for said condenser, of means for limiting the operating voltage to voltages at which substantially no free oxygen or hydrogen is liberated.

8. The combination with an electrolytic condenser, having a positive and a negative electrode, the positive electrode being of nickel, an electrolyte, and a substantially gas-tight container for said condenser, of means for limiting the operating voltage to voltages at which substantially no free oxygen or hydrogen is liberated.

9. The combination with an electrolytic condenser, having a positive and a negative electrode, the positive electrode including nickel in effective proportion, an electrolyte, and a substantially gas-tight container for said condenser, of means for limiting the operating voltage to voltages at which substantially no free oxygen or hydrogen is liberated.

10. The combination with a filter circuit containing one or more inductances, and capacities which consist of one or more sealed electrolytic cells, of means for limiting the operating voltage of said cells to voltages at which no free oxygen or hydrogen is liberated.

11. The combination with a filter circuit containing one or more inductances, and capacities which consist of one or more sealed electrolytic cells, of means for limiting the operating voltage of said cells to voltages at which no free oxygen or hydrogen is liberated, comprising a resistance and means for connecting it across said circuit at a predetermined excess voltage.

12. The combination with a filter circuit containing one or more inductances, and capacities which consist of one or more electrolytic cells, of means for limiting the operating voltage of said cells to voltages at which no free oxygen or hydrogen is liberated, and indicating means associated therewith adapted to be operated during operation of the voltage limiting means.

LAURENS HAMMOND.

CERTIFICATE OF CORRECTION.

Patent No. 1,924,606.　　　　　　　　　　　　　　　　　August 29, 1933.

LAURENS HAMMOND.

It is hereby certified that error appears in the printed specification of the above numbered patent requiring correction as follows: Page 4, line 150, claim 7, strike out the word "and"; and that the said Letters Patent should be read with this correction therein that the same may conform to the record of the case in the Patent Office.

Signed and sealed this 24th day of October, A. D. 1933.

F. M. Hopkins (Seal)　　　　　　　　　　　　　　　　　　　Acting Commissioner of Patents.